United States Patent [19]

Lee et al.

[11] Patent Number: 4,729,857

[45] Date of Patent: Mar. 8, 1988

[54] LIQUID DISTRIBUTOR FOR PACKED TOWER

[75] Inventors: Adam T. Lee, Richardson; Layton Kitterman, Gainseville, both of Tex.

[73] Assignee: Glitsch, Inc., Dallas, Tex.

[21] Appl. No.: 42,759

[22] Filed: Apr. 27, 1987

[51] Int. Cl.$^4$ .............................................. B01F 3/04
[52] U.S. Cl. ........................................ 261/97; 261/110; 261/103; 239/524
[58] Field of Search .................... 261/97, 110, 103; 239/524

[56] References Cited

U.S. PATENT DOCUMENTS

| | | | |
|---|---|---|---|
| 2,535,386 | 12/1950 | Brookins | 261/97 |
| 3,080,124 | 3/1963 | Rathmann | 239/524 |
| 3,273,872 | 9/1966 | Eckert | 261/96 |
| 3,589,689 | 6/1971 | English | 261/114 |
| 3,959,419 | 5/1976 | Kitterman | 261/98 |
| 4,066,472 | 1/1978 | Perry | 239/524 |
| 4,159,291 | 6/1979 | Bruckert et al. | 261/114 R |
| 4,264,538 | 4/1981 | Moore et al. | 261/97 |
| 4,275,021 | 6/1981 | Kirkpatrick | 261/110 |
| 4,472,325 | 9/1984 | Robbins | 261/97 |
| 4,479,909 | 10/1984 | Strenber | 261/97 |
| 4,557,877 | 12/1985 | Hofstotter | 261/97 |

FOREIGN PATENT DOCUMENTS

| | | | |
|---|---|---|---|
| 2945103 | 5/1981 | Fed. Rep. of Germany | 261/97 |
| 3141930 | 5/1983 | Fed. Rep. of Germany | 261/97 |

OTHER PUBLICATIONS

Chemical Engineering, May 27, 1985, pp. 22, 23, 25, 27, Boosting Tower Performance, McGraw-Hill.
Chemical Engineering, Mar. 5, 1984, pp. 40 et seq., How Packing Stacks Up, McGraw-Hill.

Primary Examiner—Tim Miles
Attorney, Agent, or Firm—Stanley R. Moore

[57] ABSTRACT

An improved liquid flow distributor for a process column of the type wherein the distributor is positioned above a packing section for the distribution of liquid downwardly therethrough. The improvement comprises a plurality of troughs formed with a downwardly tapering body section having holes formed therein for spewing liquid outwardly therefrom. Baffles are disposed outwardly of the lower tapering body sections of the troughs for receiving the spew of liquid therefrom and evenly distributing the liquid flow downwardly. A plurality of flow equalization pipes interconnect the troughs one with the other and are coupled to the troughs through a lower sidewall region thereof. In this manner, flow equalization between troughs is provided and the flow equalization pipes are presented in a configuration allowing debris to be removed therefrom. In one embodiment a series of screens are secured to the bottom regions of the baffles for further facilitating uniformity in flow distribution emanating from the troughs.

20 Claims, 7 Drawing Figures

LIQUID DISTRIBUTOR FOR PACKED TOWER

BACKGROUND OF THE INVENTION

1. Field of the Invention

The present invention pertains to liquid distributors for vapor-liquid contact towers and, more particularly, to a flow equalized liquid distributor for columns incorporating counter-current, vapor-liquid flow therethrough.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through and in a particular zone or zones of minimum dimensions defining the area and volume thereof. These are prerequisites of efficient operation and are necessary for close fractionation. For this reason counter-current flow of vapor and liquid within such exchange columns have become established methods of such vapor-liquid contact in the prior art. The actual vapor-liquid interface requires the utilization of a packing bed within the column. Liquid is then distributed atop the packing bed in the most feasible manner while vapor is distributed beneath the packing bed in the lower region of the tower. In this manner liquid trickling downwardly through the packing bed is exposed to the vapor ascending therethrough for vapor-liquid contact and interaction.

It is well established that the configuration of the packing bed determines the pressure drop, efficiency of the vapor-liquid interface and the concomitant mass and energy transfer occurring in a process tower. The means for effective and even distribution of the vapor and the liquid on opposite ends of the packing bed as well as maintenance of that distribution therethrough are critical to an efficient operation. Only with efficient initial vapor and liquid distribution and the maintenance of said distribution throughout the packing bed, will homogenous mixing zones be created therethrough for maximizing the efficiency therein. Efficiency is readily convertible to cost of operation and production quality. For this reason, a myriad of prior art packing designs have been prevalent in conventional exchange columns. The efficiency of the packing is, however, limited to a large extent by the efficiency of the vapor and liquid distribution thereacross. For example, failure of either vapor or liquid to evenly distribute over cross-sections of the packing effectively eliminates the utility of the part of the packing where there is poor or no distribution which in turn is directly proportional to the efficiency and cost effectiveness of the operation. Packing bed depths are critical in establishing production criteria and operational costs and failure to evenly distribute vapor-liquid and/or maintain homogeniety within the packing bed can lead to serious consequences, particularly in the petroleum refining industry.

Aside from the packing beds themselves, the liquid distributor is the most important unit of a tower internal. Failure in performance of a packed tower sometimes stems from liquid distribution problems such as clogging or uneven distribution, and thus the selection of a correct liquid distributor is critical for uninterrupted plant operation. Operational considerations thus include the functional aspects of the distributor, such as how level the distributor troughs are maintained, how well the flow is equalized therethrough, and the means through which the liquid is distributed from said troughs to the packing beds therebeneath. Also considered is the effect which the ascending vapor has on the liquid being distributed. When vapor flow areas are restricted, flow velocity can increase to the point of interrupting the descending liquid flow pattern. The liquid is, in essence, "blown" around, and this conditioning can lead to uneven distribution and inefficiency.

Conventional liquid distributors generally include the multi-orifice spray head variety adapted for dispersing liquid in the form of a spray atop a packing bed. In the utilization of dump packing wherein a plurality of randomly oriented packing elements are disposed within the exchange column, such a liquid distribution technique is sometimes effective. This is true particularly when high efficiency parameters are not of critical significance. However, in the event of high efficiency packing such as that set forth in U.S. Pat. No. 4,604,247 assigned to the assignee of the present invention, means for homogeneous liquid and gas distribution are of extreme importance.

The cost of high efficiency packing of the type set forth in the aforesaid patent commands attention to proper vapor-liquid distribution. Even small regions of non-homogenious interaction between the vapor and liquid is an expensive and wasteful loss not consistent with the utilization of high efficiency packing, where space and homogeniety in vapor-liquid interface is both expected and necessary for proper operation. High efficiency packing of the state of the art varieties set forth and shown in the aforesaid U.S. Patent requires counter-current vapor-liquid flow through the channels defined by opposed corrugations of sheets disposed therein. If the initial liquid or gas distribution fails to enter a particular corrugation pattern, then precious surface area is lost in the packing until the liquid and vapor are urged to migrate into and interact through the unfilled regions of the packing. Only by utilizing proper vapor and liquid distribution means may effective and efficient utilization of high efficiency packing as well as conventional dumped packing be assured.

The development of systems for adequate liquid distribution in process towers has been limited as set forth above. In the main, it is known to discharge and distribute liquids with spray orifices, pipes, perforated plates, apertured troughs and nozzles. Gas is concomitantly discharged in an ascending turbulent configuration to provide adequate vapor distribution. Although many prior art systems are generally effective in distributing some vapor and some liquid to most portions of the packing bed, uniform distribution thereacross is usually not obtained without more sophisticated distribution apparatus. For example, unless gas is injected into a myriad of contiguous areas beneath the packing bed with equal pressure in each area, the mass flow of vapor upwardly through the packing bed cannot be uniform. Random vapor discharge simply distributes unequal amounts of vapor across the lower regions of the packing bed but does not in any way assure equality in the distribution. Likewise the simple spray of liquid atop the packing bed, though intended to be effective in wetting all surface areas, often results in high concentrations of liquid flow in certain packing bed areas and less flow in others. This, of course, depends on the spray device. Orifice distributors are generally more susceptible to plugging than other types of distributors, and plugging is generally non-uniform leading to uneven irrigation within the tower. Surface irregularities in a distributor pan occurring during manufacture likewise increase flow resistance of some perforations or induce liquid flow along the bottom of the pan which is a distinct disadvantage. Any flow irregularity which focuses the flow in one area while reducing flow in other areas is deleterious.

It has been discovered that with pipe distributors consisting of headers equipped with tributary pipes or laterals that have holes or nozzles to spray liquid, the liquid is often distributed too finely. Tiny drops of the liquid then get carried out of the tower by counter-current gas flow. This prevents the liquid from even coming in contact with the packing bed. Since liquid contact is the purpose of the packing therebeneath, such a result totally frustrates the intent of the liquid distributor. As much as 5% of the liquid flowing through a nozzle can be converted to mist at a pressure drop of 20 psi. It has also been noted that nozzle equipped pipe distributors can produce overlapping spray patterns which result in increased flow in certain areas with reduced flow in other areas. Moreover, spray headers also release liquid at speeds that can cause it to pass vertically through the packing before it has a chance to spread out horizontally depending on the particular packing type.

These issues are important as well as the critical issue of the number of liquid distribution points necessary for various tower diameters, packings, heights, materials and systems. It is critical that the packing height not be too great wherein the weight of the packing will cause it to crush itself. However, liquid redistributors between packing sections are expensive and take up heights that could otherwise be used for mass transfer. One consideration is the type of packing being used. Structured packing can tolerate very little maldistribution while dump packing on the other hand can sustain larger variations in liquid distribution.

Unfortunately, the manifestation of uneven liquid distribution generally occurs in the vicinity of the most even, or uniform, vapor distribution. The opposite is also true. This is because vapor has had a chance to more evenly distribute through the packing bed prior to engaging the liquid distribution flow. It would be an advantage, therefore, to provide means for even liquid and vapor distribution prior to entry of said vapor and liquid into the packing bed and in a manner providing both a uniform spread of said liquid and vapor and uniform volumetric distribution thereof.

The present invention provides such an improved system of vapor-liquid distribution through a tapered trough, high efficiency distributor wherein each trough maintains a uniform liquid level through a flow equalizing system. The system is provided with an interconnected series of flow pipes that flow into the lowermost portions of the narrow, tapered troughs to equalize liquid levels and allow for drainage of liquid and debris therefrom. The flow pipe facilitates movement of multiphase liquid through the network of open, tapered troughs equipped with discharge notches or holes which would otherwise malfunction if not perfectly level or clog if debris could accumulate. Angled baffles disposed outwardly of the tapered troughs prevent liquid from being "blown" around by the ascending vapor as well as uniformly dispensing the flow. Liquid spreading screens or wires can also be used with the baffles. Pressure drop is minimized through the distributor by maximizing the free area across the tower internals. Liquid flow efficiency is thus provided in a more cost efficient, reliable configuration.

SUMMARY OF THE INVENTION

The present invention pertains to liquid distribution systems adapted for uniformly distributing liquid flow through a process tower. More particularly, one aspect of the invention comprises an improved liquid distributor for process columns of the type wherein vapor is injected into the column for ascension therethrough and liquid is dispersed in the column for downward flow. Packing sections or beds are disposed in the tower for facilitating the interaction of vapor and liquid passing in counter-current flow therethrough. The improvement comprises a liquid flow distributor adapted for positioning above and/or below the packing section for the even distribution of liquid downwardly therethrough. The distributor comprises a trough having a downwardly tapering lower body section constructed with baffles disposed outwardly therefrom. The baffles are spaced from the angulated trough section a select distance for receiving the spew or flow of liquid from the trough. Distributor flow sheets may also be secured to and depend from the baffles for enhancing flow distribution characteristics. The liquid is therein encouraged to spread evenly across the inside area of the baffle, away from the rising vapor flow, for even distribution and discharge to the underlying packing bed. The baffle includes dripping interrupters comprising standoffs between the baffle and the trough. The standoffs also provide means for securing the baffle to the trough. A plurality of flow sections are thus provided for flow interruption in case certain sections of the trough are out of level. A single or multiple orifice configuration is provided in the trough with a first orifice disposed inwardly of the baffle and a second orifice disposed thereabove for spewing liquid outwardly onto the underlying packing bed. Flow equalization pipes interconnect the side and/or ends of each trough to allow full volume drainage, structural security and flow equalization therebetween.

In another aspect of the invention described above, the liquid distributor comprises a generally V-shaped trough section having an angulated baffle disposed outwardly therefrom comprising an impingement surface outwardly juxtaposed a plurality of orifices constructed for discharging liquid thereon. The flow equalization pipes also provide structural support as well as flow conduits as they are secured to the lower side wall portions of the troughs or the distal ends thereof. The conduits disposed adjacent the bottom of the troughs allow fluid to flow between adjacent troughs for fluid level equalization therebetween. Debris and solids can also be removed through the conduits in a "self cleaning" mode. Such configurations are marked advances over prior art irrigation systems producing clogged, uneven, localized or focused irrigation which is the antithesis of efficient tower internals operation.

In another aspect of the invention, the above-described angulated baffles prevent the upper flow of vapor to engage the liquid discharging from the trough in the manner that would disrupt uniform liquid flow therefrom. A significant amount of the ascending vapor around the troughs is thus deflected outwardly by the angulated baffles. In this manner it does not directly disturb the liquid spewing from the V-shaped trough. Some vapor ascension rate rise is manifest inside the baffles where it actually enhances lateral distribution of the liquid stream spewing thereon. The spreading liquid is then allowed to sheet out upon the substantially protected inside wall of the angulated baffle and distribute evenly across the lower region thereof. Likewise the vapor is deflected at an angle which facilitates the uniformity of upwardly flow. Since liquid distribution is improved, the troughs may be spaced further apart for equivalent liquid distribution. The wider trough spacing provides a higher degree of "free area" within the tower internals. Greater free area reduces resistance to ascending vapor flow and thus a decrease in disadvantageous vapor velocity adjacent descending liquid flow. Reduced vapor velocity concommitantly permits better liquid sheeting and fluid distribution which substantially reduces the amount of liquid carried upwardly by the counter-current vapor. In this manner efficiency is greatly improved and cost savings are provided.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
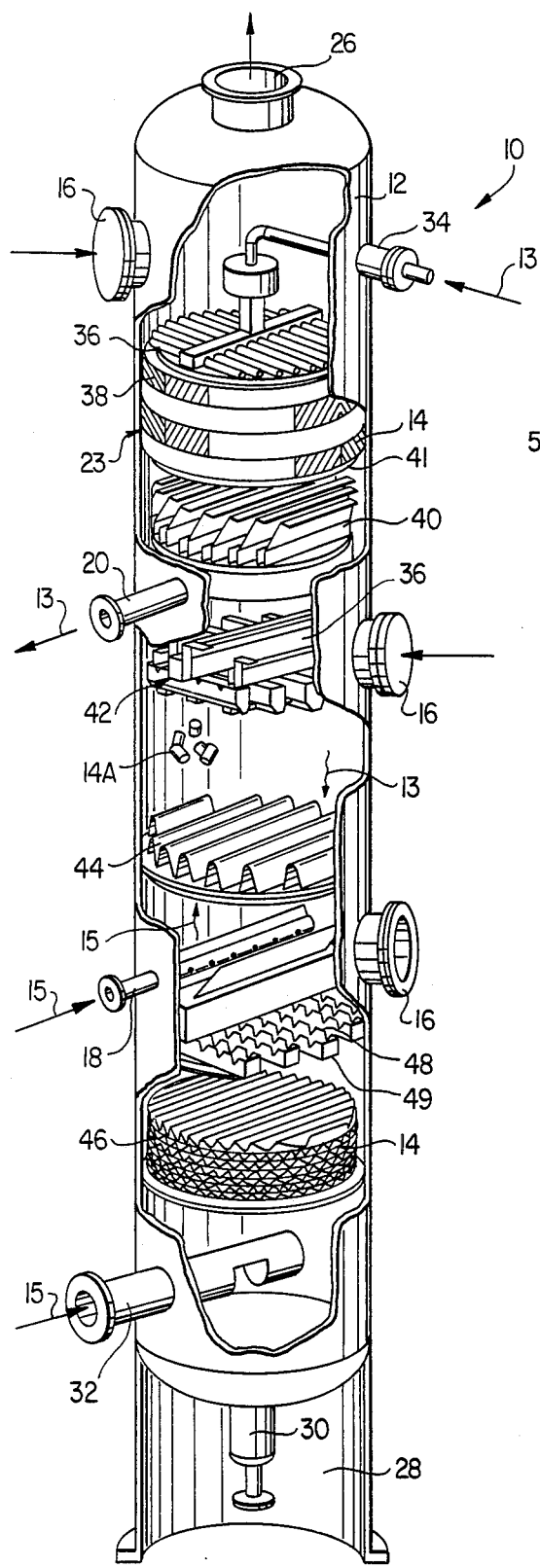
FIG. 1 is a perspective view of a packed column with various sections cut away for illustrating a variety of tower internals in one embodiment of a liquid flow distributor constructed in accordance with the principles of the present invention.

Referring first to FIG. 1 there is shown a perspective view of a packed exchange tower or column with various sections cut away for illustrating a variety of internals and the utilization of one embodiment of the liquid distributor of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for placement of the packing beds 14. Also provided are side stream draw off line 20, side feed line for liquid 18, and side stream vapor feed line or reboiler return line 32. A reflux return line 34 is provided atop the tower 10.

In operation, liquid is fed into the tower 10 through reflux return line 34 and side stream feed input feed line 18. The liquid flows downwardly through the tower and ultimately leaves the tower either at side stream draw off 20, or at bottom stream draw off line 30. In its downward flow, the liquid is depleted of some material which evaporates from it as it passes through the packing beds, and is enriched or added to by material which condenses into it out of the vapor stream.

Still referring to FIG. 1 the exchange column 10 further includes a vapor outlet, overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for purpose of illustration and include a liquid collector 40 disposed beneath a support grid 41 in support of the upper structured packing 38. A liquid redistributor 42 is likewise disposed thereunderneath and an intermediate support plate 44 is provided in an alternative configuration of the type adapted for supporting random packing 14A of a ring or saddle variety as representatively shown. A lower structure grid 46 is illustrated disposed beneath a liquid distributor 48 comprising a plurality of troughs 49 adapted for dispersing the liquid thereacross in counter-current flow to the ascending vapor thereunderneath. It may be seen from this figure that the counter-current configuration between the ascending vapor and the descending liquid is the subject of a plurality of critical design considerations including liquid/vapor ratios, liquid cooling, foaming and the presence of solids or slurries therein. Corrosion is likewise a consideration of the various elements in the packed towers and the selection of the material in the fabrication of the tower internals is in many instances the results thereof. The anatomy of the packed column as shown in FIG. 1 is likewise described in more detail in the Gilbert Chen article referred to above and incorporated herein by reference.

Figure 2:
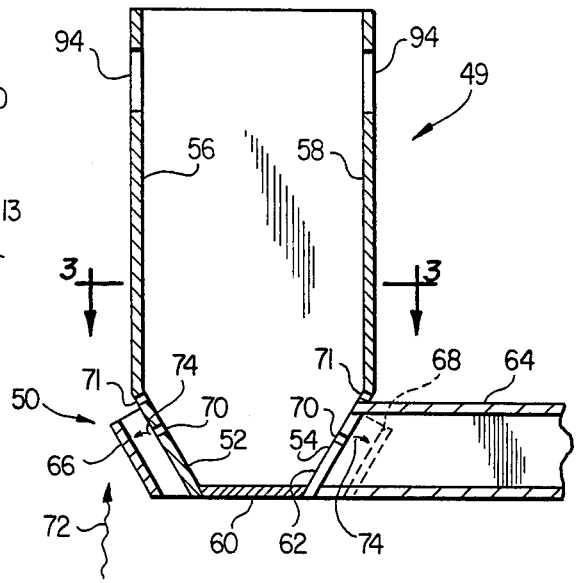
FIG. 2 is an enlarged, side-elevational, cross-sectional view of a liquid distributor trough and equalizer pipe array constructed in accordance with the principles of the present invention.
Figure 5:
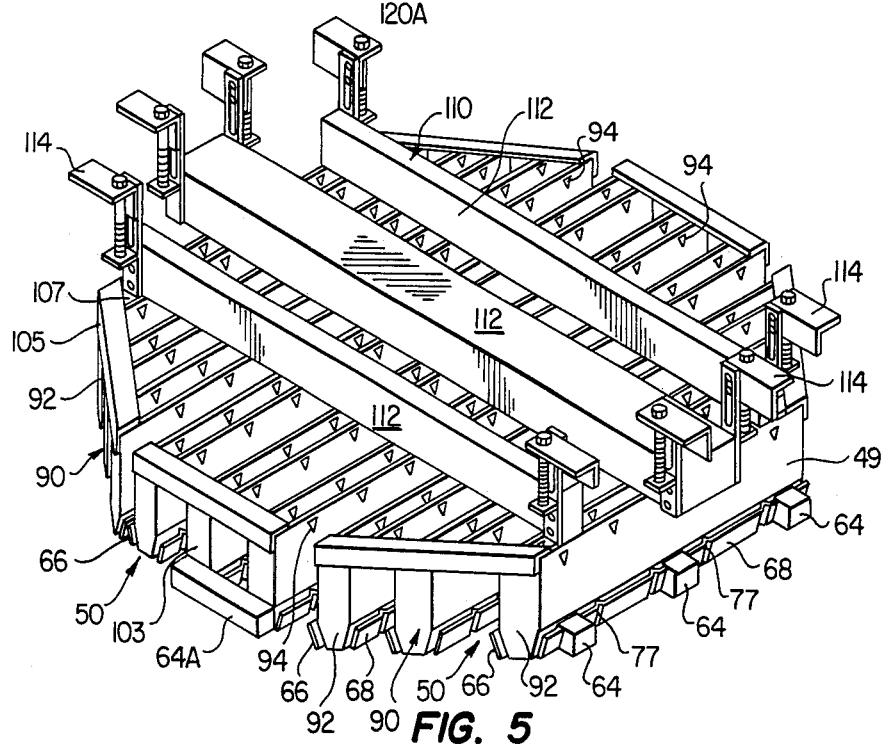
FIG. 5 is an enlarged, perspective view of the flow distributor array of the present invention illustrating the V-shaped trough and flow equalizer configuration.

Referring now to FIG. 2 there is shown an enlarged end-elevational, cross-sectional view of a trough 49 having a lower generally V-shaped body section 50. The trough section 50 is comprised of angulated outer walls 52 and 54 depending from upper parallel trough walls 56 and 58, respectively. A bottom surface 60 joins the tapered walls 52 and 54 and is aligned to and in flow communication with an array of equalizer conduits 64 through apertures 62 formed in the side walls. The conduit or pipe 64 is secured to the sidewall 54 at aperture 62 of the trough 49 by welding or the like and facilitates the flow of liquid between various troughs (as seen in FIG. 5) for fluid level equalization therein and debris elimination from trough bottom 60.

Still referring to FIG. 2, first and second baffles 66 and 68 are shown disposed in an angulated orientation relative to the trough section 50 and outwardly of tapered walls 52 and 54. The baffles 66 and 68 are positioned in generally parallel spaced relationship relative to the trough walls 52 and 54 respectively. A first orifice 70 is formed in a lower region of each tapered wall 52 and 54 inwardly of the baffles 66 and 68 for permitting the spewing of fluid into the inside surface of said baffles. In this manner, vapor travelling upwardly in the direction of arrow 72 is deflected outwardly from the spew of liquid shown by arrow 74 thereby protecting said liquid from dispersion by said ascending vapor. In this manner the liquid level can be established within each trough in an equalized configuration with the discharge of liquid therefrom in a controlled and protected fashion not subject to dispersion by the ascending vapor flow. Second discharge orifices 71—71 are formed above orifices 70—70 in walls 52 and 54 for spewing liquid over the top of baffles 66 and 68. This direct discharge acts in conjunction with the baffled discharge when the liquid level in the trough 49 reaches a sufficiently high level. Because of the increased free area between troughs 49 afforded by the present invention and discussed in more detail below the ascending vapor velocity will often be sufficiently low to have only minimum effect on the direct spray from the orifices 71—71.

Figure 3:
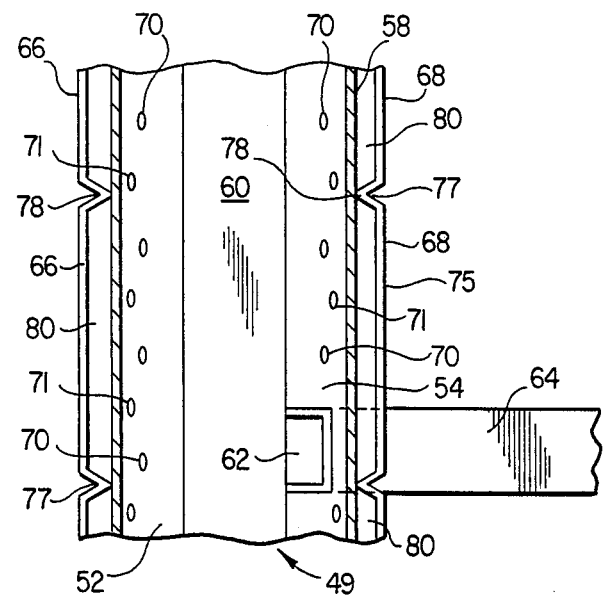
FIG. 3 is an enlarged, top plan, cross-sectional view of the trough of FIG. 2 taken along lines 3—3 thereof and illustrating the baffle and wall section configuration of the trough.

Referring now to FIG. 3, there is shown an enlarged top-plan, cross-sectional, fragmentary view of the trough 49 of FIG. 2 with the baffles 66 and 68 secured outwardly thereof. The trough 49 is shown with generally vertical walls 56 and 58 atop lower tapered walls 52 and 54 with rectangular orifices 70 shown formed therein. Bottom region 60 is thus shown disposed beneath the angulated walls 52 and 54 with flow equalizing aperture 62 constructed adjacent thereto.

Still referring to FIG. 3 the baffles 66 and 68 are shown to be formed outwardly of the tapered walls 52 and 54 in generally parallel spaced relationship relative thereto. The baffles 66 and 68 comprise elongate plate members 75 having a plurality of indentation sections 77 constructed therein. Each indentation is formed in a generally V-shaped configuration, the apex 78 of which is welded to the outside surface of tapered walls 52 and 54. In this manner a plurality of segregated flow regions 80 are provided between each indentation or standoff 77. The indentations 77 further serve as drip interrupters in case the trough 49 becomes uneven.

Figure 4:
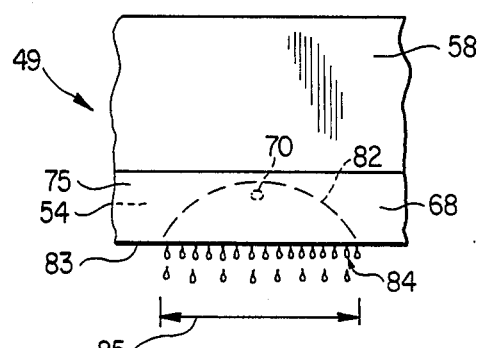
FIG. 4 is a diagrammatical schematic of the liquid distribution and irrigation of the trough baffle configuration of FIG. 2.

Referring now to FIG. 4 there is shown a diagrammatic schematic of the baffle 68 of the present invention with orifice 70 formed in angulated wall 54 adjacent thereto shown in phantom. The spew of liquid through orifice 70 shown to form a generally parabolic curve upon the surface 75 of said baffle. The parabolic liquid spread pattern 82 comprises that wetted surface area that liquid spewing from the trough 49 engages for lateral spreading prior to dripping and discharge across lower surface 83 of the baffle 68. A drip pattern 84 is thus shown beneath lower edge 83. A dimension arrow 85 is illustrated therebeneath representing the irrigated area, which may be of a packing bed disposed beneath the trough 49. The irrigated area of the packing bed is sufficiently wide to permit effective flow distribution from the redistributing assembly of trough 49. It may be seen that orifices 70 disposed from one another distances no greater than the irrigation area 85 would permit contiguous and/or overlapping irrigation of packing beds therebeneath in accordance with the principles of the present invention. Said packing bed irrigation is a critical aspect of proper flow redistribution and as stated above the flow dripping discharge 84 is substantially protected from the ascending vapor flow 72 by the angulated baffles 66 and 68. Moreover, due to the efficiency of the construction troughs 49, a wider spacing between adjacent troughs is possible. As will be shown below, this wider spacing increases the free area between said troughs and reduces the restriction to flow of vapor 72 and thus the velocity thereof. Reduction in velocity of ascending vapor further eliminates the tendency of said vapor to pick up droplets of liquid 84, a serious, counter-efficiency in liquid distribution systems. Although vapor-liquid interaction is highly desirable and effective in packing beds, this effect is not the goal of a liquid distributor for purposes of uniform vapor-liquid interaction within high efficiency packing bed configurations.

Referring now to FIG. 5 there is shown a plurality of troughs 49 constructed in accordance with the principles of the present invention and secured one to the other by a plurality of equalizer pipes 64 disposed therebetween. The pipes may also be disposed across ends of certain ones of the troughs 49 as shown by pipe 64A in FIG. 5. It may also be seen that the angulated trough sections 50 are constructed inwardly of the baffles 66 and 68 as shown in this perspective view. Trough ends 90 are of a shorter longitudinal configuration and include an angulated endface 92 for purposes of fitting within a cylindrical process tower such as that shown in FIG. 1. The equalizer pipes 64 are shown to both provide liquid equalization between adjacent troughs 49 as well as providing means for securing the lateral configuration thereof.

Figure 6:
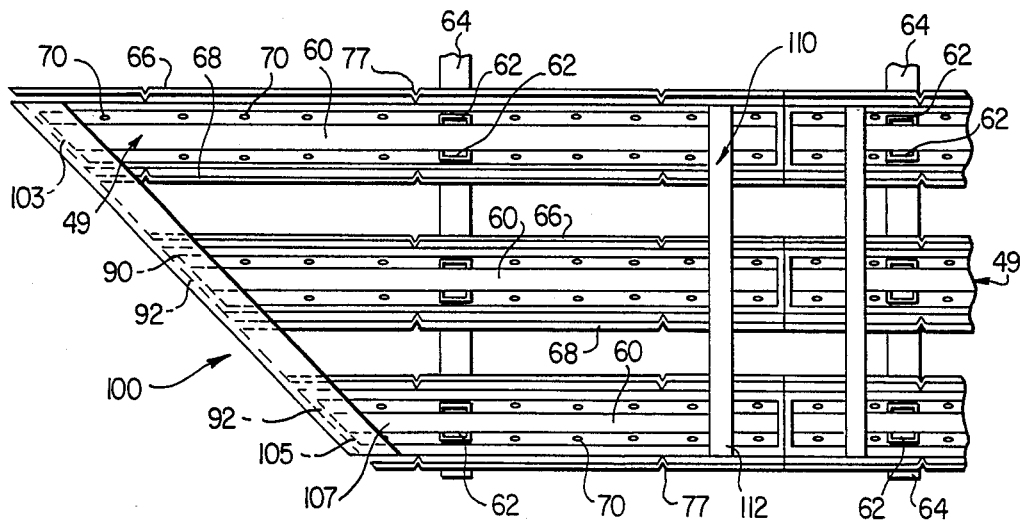
FIG. 6 is a top plan, fragmentary view of the trough support and leveling system of FIG. 5.

Referring now to FIG. 6 there is shown an array 100 of troughs 49 constructed in accordance with the principles of the present invention. Baffles 66 and 68 are shown disposed on opposite sides of each trough for establishing preselect continuous irrigation areas as defined above. As stated above, the flow equalizer pipes 64 may also be constructed across the distal ends of the troughs 49 in those configurations where the trough where space permits. (Not shown in FIG. 6). In the present configuration the distal ends 103 of each trough are angulated for positioning within a round tower such as that shown in FIG. 1. In particular, end 105 of outside trough 107 is substantially angulated to permit installation within the circular dimension of the process tower.

Referring to FIGS. 5 and 6 in combination there is shown a trough support system 110 comprising a plurality of support channels 112 secured along the top of each trough 49. The channels 112 are supported on opposite ends by adjustable mounting brackets 114 which permit the securement and adjustable leveling of the trough array 100. It is important to note that although the present invention provides for flow equalization between troughs it is necessary that the trough array 100 be initially positioned in the level configuration within the processed tower for purposes of proper operation. The adjustability of the fastening brackets 114 further facilitates flow level equalizations for routine maintenance during and after tower operation.

Figure 7:
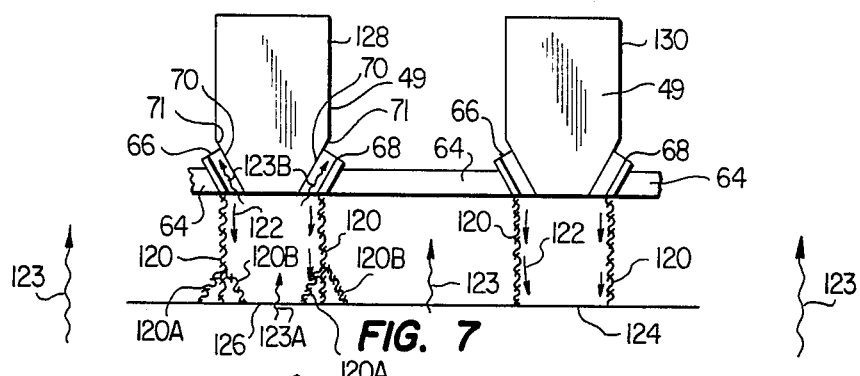
FIG. 7 is an enlarged end elevational view of an alternative embodiment of the flow baffles of the present invention and a diagrammatic representation of the increased vapor flow "free area".

Referring now to FIG. 7 there is shown an end elevational, fragmentary view of an alternative embodiment of the present invention utilizing liquid dispersion screens or sheets 120 disposed beneath each trough 49. It should be noted that an array of wires, secured at one end to the baffles 66 and 68, and depending downwardly in place of the screens 120 may also be used. The wires can be bent outwardly and inwardly for enhanced distribution similar to the alternative "flanged" embodiment of the sheets 120 described below. The liquid dispersion sheets 120 are secured to the trough 49 along the lower edge of the baffles 66 and 68. Liquid which spews on said baffles and disperses into the pattern 82 discussed above is thus allowed to continue its downward migration into an underlying packing bed 124 without adverse disruption by the ascending vapor flow. In the present drawing, the liquid is shown by arrows 122 distributed on the sides of the sheets 120 and protected from the ascending vapor illustrated by arrow 123. The velocity of rise of the ascending vapor 123 can be a substantial problem to even liquid distribution due to the fact that it can blow the dripping vapor around into undesirable areas. When the vapor 123 engages liquid dispersed upon a sheet 120 it has less capacity to cause the distribution problem normally found in the prior art. It will, however, induce liquid spreading on the sheets 120 which is advantageous. Liquid spreading is also induced by the vapor ascension rate between sheets 120 of a common trough 49 as shown by arrows 123A and 123B. The ascending vapor 123B behind the baffles 66 and 68 accelerates due to the restricted flow area and causes the liquid spewing from holes 70 and 71 to spread in this finite area which enhances lateral distribution. In this "finale" area the liquid streams are under some pressure and distribution is enhanced by high vapor flow rates as compared to the problem normally caused by high vapor flow rates.

Still referring to FIG. 7, sheets 120 can be formed of either solid, perforated, woven or similar lamella design of the type normally incorporated into countercurrent, vapor-liquid process columns. The lower edges can also incorporate "flanged" or outwardly bent sections 120A and 120B which further enhance distribution, as shown for illustration in the left trough 49 of FIG. 7. The sheets 120 are particularly useful in columns experiencing problems with vapor flow rates and uneven liquid distribution. This problem is addressed by the principles of the present invention which incorporate a baffled trough configuration in conjunction with equalizing pipes 64 with the distribution screen 120 depending therefrom. In this manner, the spacing between adjacent troughs 49 is maximized to reduce vapor ascension resistance and velocity. Uniformity of vapor liquid interaction is then assured by even liquid distribution between troughs 49. Another advantage of the present invention as set forth above is the ability to provide flow equalization with the flow pipes 64 disposed in side wall portions of each trough 49. It is more economical to secure such flow pipes to the trough side walls than the trough bottom. The advantages are multifold in such assemblies. Of a distinct advantage is the height of the distributor relative to the column 10. Any height in the column 10 which must be used for other than vapor liquid interaction reduces efficiency and column effectiveness. By disposing the pipes between adjacent troughs 49 rather than beneath them, valuable height is not lost in the assembly. Moreover, the positioning of the flow equalization pipes 64 beneath the troughs 49 rather than adjacent thereto can result in the accumulation of debris which the flow pipes should help eliminate. Flow pipes disposed beneath the troughs 49 can provide a receptacle for collection of debris rather than removal if the debris simply flows downwardly from the floors of the troughs. In the present configuration the bottom of each pipe 64 is juxtaposed the bottom portion 60 of each trough 49 whereby debris can be "washed" therefrom. Manufacturing effectiveness, efficiency and cost is thus improved while the usefulness in an operational column 10 is enhanced. The present distributor thus facilitates maximum use of high efficiency packing by providing efficient flow distribution prior to liquid flow entry into such packing. These desirable results can be obtained with a minimum of height loss within the tower along with the ability for self-regulating flow equalization between adjacent troughs.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An improved liquid flow distributor for a process column of the type wherein said distributor is positioned above a packing section for the distribution of liquid downwardly therethrough, said improvement comprising:
    a plurality of troughs disposed in generally parallel spaced relationship;
    said troughs each being formed with a downwardly tapering lower body section terminating in a bottom region, said lower body section having holes formed therein for spewing liquid outwardly therefrom;
    first and second baffles disposed outwardly of said lower tapering body section of said troughs for receiving the spew of liquid therefrom, said baffles each being disposed in generally parallel spaced relationship with said adjacent tapering body section of said troughs;
    a plurality of flow equalization pipes interconnecting said troughs one to the other; and
    said equalization pipes being coupled to said troughs through the side wall thereof in flow communication with the lower region therein facilitating flow equalization therebetween.

2. The apparatus as set forth in claim 1 wherein said baffles include dripping interrupters comprising standoffs between said baffles and said trough.

3. The apparatus as set forth in claim 2 wherein said standoffs comprise indented sections of said baffles, the apex of said indented sections being secured to said tapered side wall of said trough.

4. The apparatus as set forth in claim 1 wherein said sidewalls of said troughs are constructed with a first lower row of apertures adapted for allowing the outward flow of liquid therefrom onto said baffles and a second row of apertures disposed above said baffles for the outward flow of liquid thereover.

5. The apparatus as set forth in claim 1 and further including a plurality of liquid dispersion sheets disposed beneath said baffles, said sheets being positioned to receive the direct liquid flow from said baffles.

6. The apparatus as set forth in claim 5 wherein said sheets comprise generally planar screens secured to the lower edge of each of said baffles for receiving the dispersed flow of liquid therefrom.

7. The apparatus as set forth in claim 1 wherein said flow equalization pipes comprise generally rectangular members and said intersection with said trough forms a generally rectangular aperture in the side wall thereof.

8. The apparatus as set forth in claim 1 wherein said pipes are of a generally round, cross-sectional configuration, said intersection with said troughs therein forming a generally oval aperture in the side walls thereof.

9. The apparatus as set forth in claim 1 wherein said flow equalization pipes are further disposed on the ends of adjacent troughs in flow communication with the end region thereof for flow horizontally therebetween.

10. The apparatus as set forth in claim 1 and further including leveling means for facilitating adjustment of the trough within a process tower and the flow equalization therebetween.

11. An improved liquid flow distributor for a process column of the type wherein said distributor is positioned above a packing section for the distribution of liquid downwardly therethrough, said improvement comprising:
 a plurality of troughs disposed in generally parallel spaced relationship;
 said troughs each being formed with a downwardly tapering lower body section terminating in a bottom region, said lower body section having holes formed therein for spewing liquid outwardly therefrom;
 first and second baffles disposed outwardly of said lower tapering body section of said troughs for receiving the spew of liquid therefrom, said baffles each being disposed in generally parallel spaced relationship with said adjacent tapering body section of said troughs;
 means for providing flow equalization between said troughs; and
 a plurality of sheets secured to and depending from said baffles of said troughs for evenly distributing liquid therebeneath.

12. The apparatus as set forth in claim 11 wherein said baffles include dripping interrupters comprising standoffs between said baffles and said trough.

13. The apparatus as set forth in claim 12 wherein said standoffs comprise indented sections of said baffles, the apex of said indented section being secured to said tapered side wall of said trough.

14. The apparatus as set forth in claim 11 wherein said sidewalls of said troughs are constructed with a first lower row of apertures adapted for allowing the outward flow of liquid therefrom onto said baffles and a second row of apertures disposed above said baffles for the outward flow of liquid thereover.

15. The apparatus as set forth in claim 11 wherein said flow equalization means comprises a plurality of equalization pipes intercornecting said troughs.

16. The apparatus as set forth in claim 15 wherein said equalization pipes are coupled to said troughs through the side wall thereof in flow communication with the lower region therein facilitating flow equalization therebetween.

17. The apparatus as set forth in claim 16 wherein said flow equalization pipes comprise generally rectangular members and said intersection with said trough forms a generally rectangular aperture in the side wall thereof.

18. The apparatus as set forth in claim 16 wherein said pipes are of a generally round, cross-sectional configuration, said intersection with said troughs therein forming a generally oval aperture in the side walls thereof.

19. The apparatus as set forth in claim 16 wherein said flow equalization pipes are further disposed on the ends of adjacent troughs in flow communication with the end region thereof for flow horizontally therebetween.

20. The apparatus as set forth in claim 11 and further including leveling means for facilitating adjustment of the trough within a process tower and the flow equalization therebetween.

* * * * *